July 22, 1924.

P. KUCERA 1,502,474

DEVICE FOR MAKING FLUTED GLASS MOLDS OR THE LIKE

Filed March 14, 1921    3 Sheets-Sheet 1

Inventor
Peter Kucera
By George Ramsey
his Attorney

July 22, 1924.
P. KUCERA
1,502,474
DEVICE FOR MAKING FLUTED GLASS MOLDS OR THE LIKE
Filed March 14, 1921   3 Sheets-Sheet 3
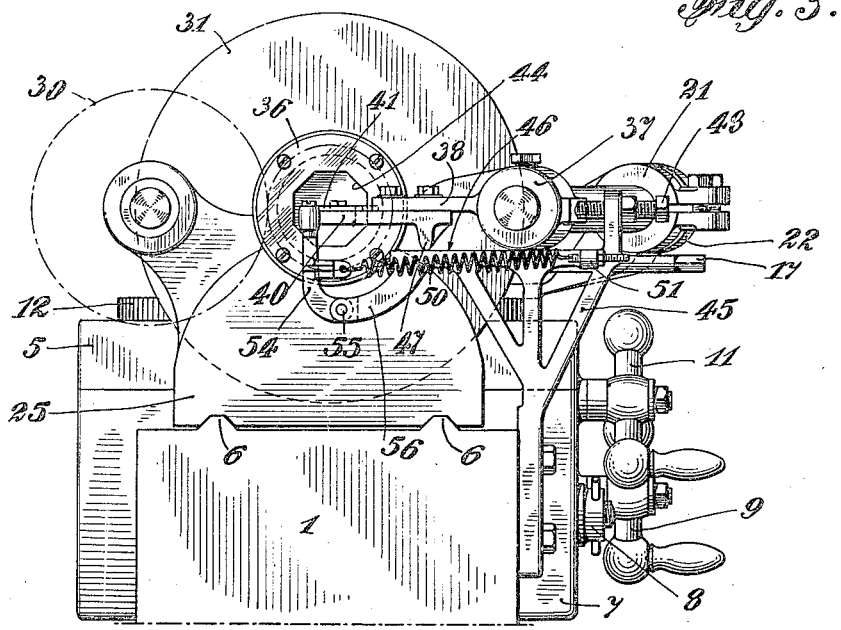
Fig. 3.
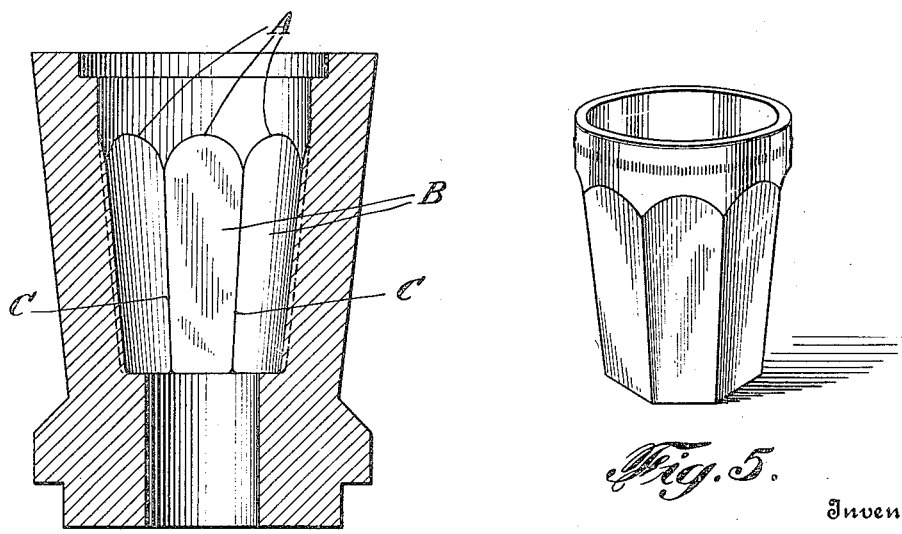
Fig. 4.
Fig. 5.
Inventor
Peter Kucera
By George Ramsey
his Attorney Patented July 22, 1924.

1,502,474

UNITED STATES PATENT OFFICE.

PETER KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

DEVICE FOR MAKING FLUTED GLASS MOLDS OR THE LIKE.

Application filed March 14, 1921. Serial No. 452,373.

*To all whom it may concern:*

Be it known that I, PETER KUCERA, a citizen of the United States, and a resident of the city of Connellsville, in the county of Fayette, State of Pennsylvania, have invented new and useful Improvements in Devices for Making Fluted Glass Molds or the like, of which the following is a specification.

This invention relates to devices for the manufacturing of glass machinery and more specially to a device for making fluted block molds for glass tumblers and the like.

The principal object of the invention is a device adapted to automatically cut the matrix of a configurated block mold by causing a forming tool to move under control of predetermined pattern devices.

A further object of the present invention is a machine for shaping the interior of hollow objects in accordance with predetermined pattern devices which are moved consonantly with the relative movement between a forming tool and the side wall of the object being shaped.

A still further object of the present invention is a device of the character specified and wherein the pattern and the mold are adapted to be mounted on the same shaft and rotated simultaneously.

A still further object of the present invention is a device for shaping block molds for manufacturing of glass articles such as tumblers, or the like, with fluted sides and wherein the formation of the matrix of the mold is automatically controlled by suitable pattern members.

A still further object of the present invention is a device for forming the matrix portion of block molds for molding fluted glassware or the like in accordance with a predetermined pattern and wherein both the pattern and the mold are carried upon the same supporting member to rotate coordinately and simultaneously.

A still further and important object of the present invention is an attachment for a turret lathe or the like whereby the same is adapted for automatically shaping the matrix portion of block molds or the like according to a predetermined pattern wherein the pattern is arranged to automatically oscillate the turret in accordance with the shape desired.

Another important object is an attachment for a turret lathe for shaping articles and wherein the article being shaped and the pattern therefor are both mounted on the main drive shaft for the lathe and with the pattern being adapted to oscillate the turret to cause the cutting tool to shape the object as desired.

Other and further objects of the present invention will in part be obvious and will in part be pointed out hereinafter in the specification following by reference to the accompanying drawings in which like characters represent like parts throughout the several figures thereof.

Realizing that the present invention may be embodied in constructions other than those specifically herein shown it is desired that the disclosure herewith shall be considered as illustrative and not in the limiting sense.

Figure 3 is a detail view looking at the end of the pattern control mechanism;

Figure 4 is a sectional view of a mold made by the present invention;

Figure 5 is a perspective view of a glass tumbler shaped in said mold.

Figure 1:
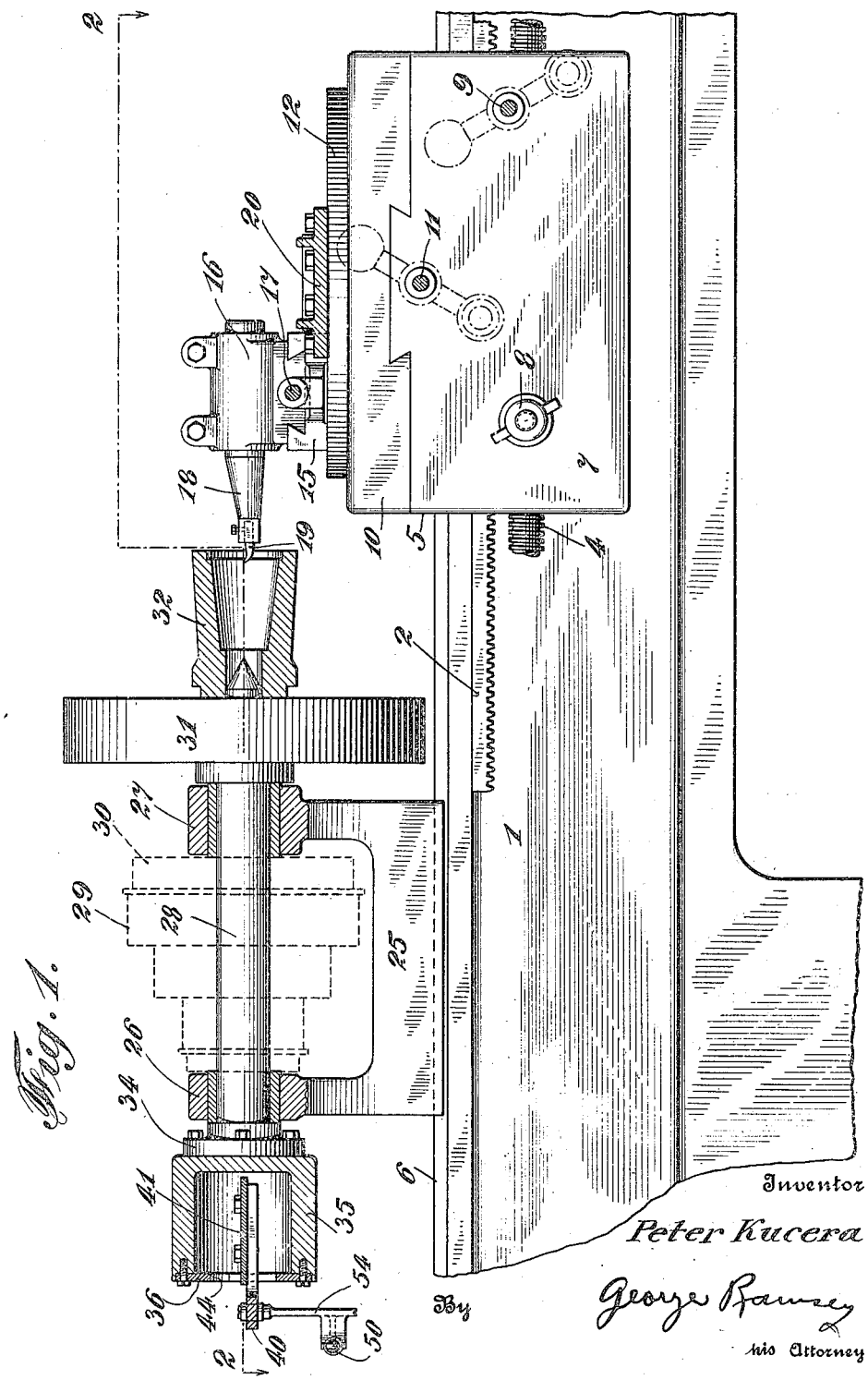
Figure 1 is an elevational view, more or less diagrammatical in character, and illustrating portions of the device in section. This figure is taken substantially on line 1—1 of Figure 2.
Figure 2:
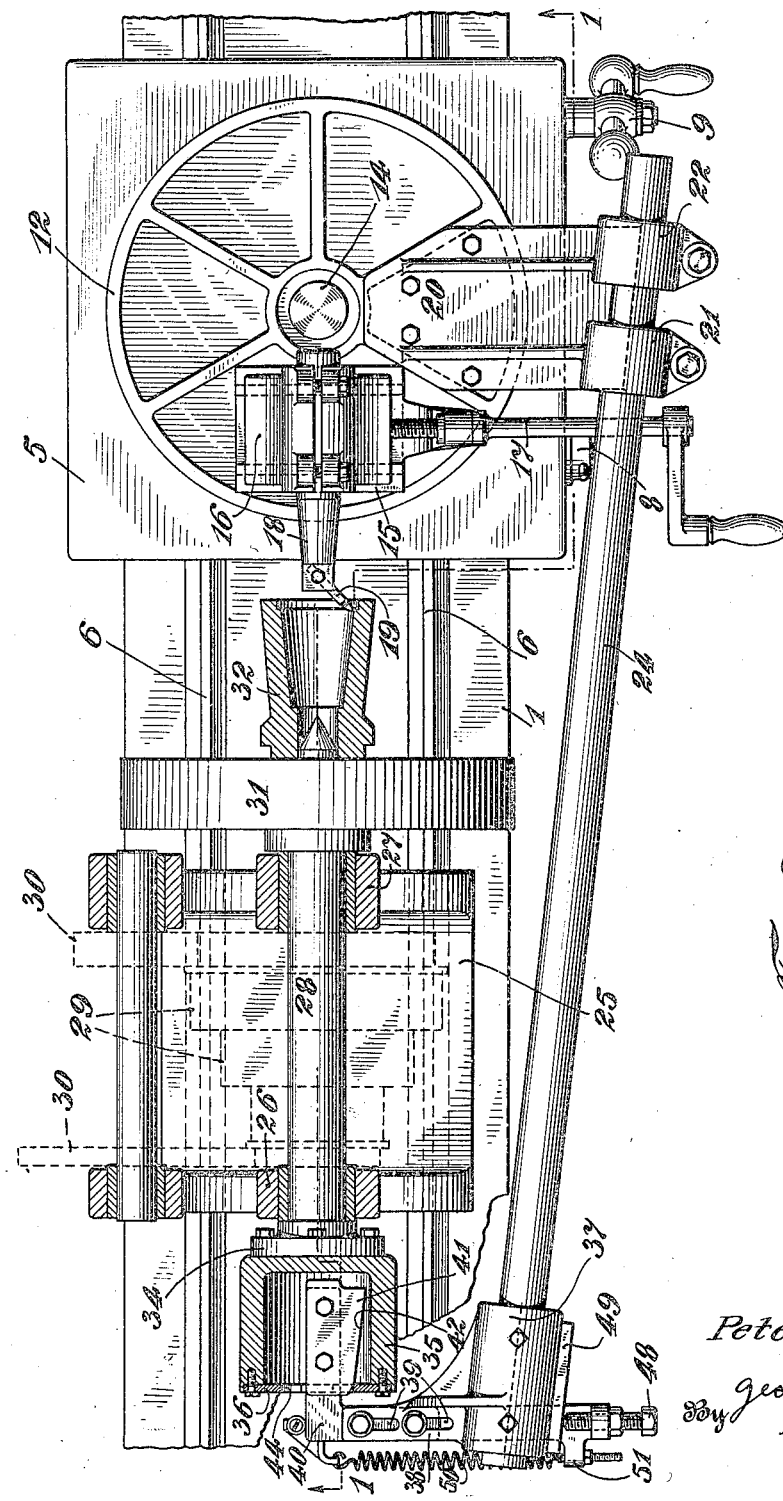
Figure 2 is a plan view taken on line 2—2 of Figure 1.

Heretofore in the glass machinery art fluted molds have been very expensive because it was necessary to make these molds by hand and it usually took a workman from two and one half to three days to make each mold. In view of the fact that the molds wear and that in the operation of the machines the molds are apt to be ruined it will be seen that the manufacture of molds becomes a very expensive and important problem in a glass factory. By means of the present invention the molds are accurately and quickly made by mounting the mold body on the same shaft as a master pattern and then using a templet plate on an actuating arm to cooperate with the master pattern so that the design formed is controlled both by the templet plate and the master pattern. Two relative movements are provided between the master pattern and the templet plate; one movement being rotary and the other being longitudinal so that for a definite rotation of the mold the cutting tool is influenced by the two forms, one being the form of the templet plate and the other being the form of the master pattern. In carrying out the present invention an ordinary turret lathe may be utilized and members may be added thereto, as attachments secured to the turret head and to the main shaft of the lathe so that by a relatively small expense a turret lathe may be converted into an automatic machine for shaping fluted molds or the like and wherein the operation on the mold is largely mechanical and therefore requires but the ordinary machinist to operate the same. By means of this improved construction fluted or configurated molds may be manufactured in a few hours at a relatively low expense.

Referring now to the drawings, which illustrate one embodiment of the present invention, as an attachment to a common form of turret lathe; the turret lathe mechanism, which is well known in the art, is only diagrammatically illustrated, and comprises bed 1 provided adjacent one side thereof with a feed rack 2 and a lead screw 4. The usual carriage 5 is mounted to slide on the ways 6 on the bed 1, and the carriage is provided with the usual apron 7 which carries the usual clutch adapted to engage the lead screw and to be operated by the clutch handle 8, and also the usual hand feed handle 9 connecting with the pinion in engagement with the rack 2, all of which is common in the art. The carriage 5 carries the usual cross slide 10 which is adapted to be positioned by the hand feed handle 11. This cross feed carries a rotatable turret 12 that is adapted to rotate about the pivot bolt 14 and is also adapted to carry turret tools after the fashion of the usual turret lathe. A base 15 of the tool support 16 is mounted on the turret 12 and the tool support 16 is mounted to slide on the base 15 under control of a hand feed screw 17. This tool support 16 is adapted to carry a tool holder 18 on the end of which is mounted a cutting tool 19. It will be understood, in applying the present invention to a turret lathe the usual indexing and locking means are unnecessary and are therefore rendered ineffective in any suitable manner.

An arm base-plate 20 is also securely mounted on the turret and in the present form is mounted at approximately ninety degrees to the mounting on the tool holder base 16 on the turret plate 12. This arm base plate 20 is provided with a pair of bosses 21 and 22 which are adapted to clamp and hold an actuating arm 24 that extends above and substantially parallel to the lathe bed and past the head 25 of the lathe. This lathe head 25 is of the usual form and is provided with bearings 26 and 27 which support the main shaft 28. This main shaft carries the usual cone pulley 29 and back gears 30 together with their operating parts, as is common in the art. These driving members are indicated in dotted lines in order to avoid confusion of parts and more clearly bring out the present invention. It is also to be understood that the cone pulley 29 is connected by suitable gearing with the lead screw 4, as is common in the art, in order that the lead screw may be definitely driven with relation to the rotation imparted to the main shaft 28. The main shaft 28 carries at its forward end a chuck 31 of usual form which is shown diagrammatically in the drawings and on which is mounted a block mold body 32 suitably secured to the chuck 31 and upon which the cutting tool 19 is adapted to operate. The outer end of the main shaft 28 is also provided with a chuck 34 on which is mounted a pattern support 35, which may comprise either a cup shaped member or an open spider holder of sufficient depth for the purpose required. This pattern support carries a master pattern 36 which may be in the form of a plate provided with an opening of the contour desired. In the present disclosure the opening in the master pattern is octagonal in form. This plate as well as the support therefor is adapted to be removably mounted in order that the patterns may be changed when desired. The outer end of the actuating arm carries a boss 37 from which extends a bracket 38 that is slotted as at 39 in order to provide a sliding adjustment for the plate arm 40 which is bolted to the bracket 38. This plate arm, in the present embodiment, is illustrated as being L-shaped with one portion extending into the pattern support 35. A profile member or templet plate 41 is detachably mounted on the plate arm 40 in such manner that the guiding edge 42 is adapted to engage the control edge 44 of the master pattern, when desired, to control the movement of the actuating arm. In order to support the actuating arm, a supporting bracket 45 may be bolted to the machine bed and is provided with a supporting surface 46 upon which the boss 37 is adapted to slide. The plate arm 40 is also preferably provided with a depending rib 47 which slides on the supporting surface 46 so that the actuating portion of the device is well supported in its movements. In order to control the point, in the operation of the machine, at which the templet shall initially engage the master pattern, a stop may be provided and this stop may comprise a stub-bolt 48 which is adapted to contact with an embossment 49 on the boss 37.

The parts are normally maintained either against the stops or with the templet against the control edge of the master pattern by a yielding spring connection that may comprise a coil spring 50 which is attached at one end to an adjustable anchor 51 carried by the bracket 52 on the supporting bracket 45 and the coil spring is secured at the other end to a lever arm 54 which is pivoted as at 55 to the bracket 56 and carries at its upper end an anti-friction roll that contacts with the edge of the plate arm 40 and urges the actuating arm outwardly. In view of the fact that the actuating arm moves longitudinally with the main carriage the spring and roller construction permits of the necessary movement without disturbing the character of the holding pressure desired.

From the foregoing it will appear that the present invention may comprise the entire construction or may comprise merely the adaptation of the ordinary turret lathe to include the present invention.

In the operation of the machine embodying the present invention the block mold 32 to be operated upon is secured on the chuck 31 on the main shaft 28, and the master pattern 36 together with the pattern support are similarly secured to the chuck 34 on the other end of the main shaft so that the master pattern and the block mold will rotate together. The carriage 5 is backed away from the mold, thereby causing the templet 41 to move into and axially of the pattern support and to a point where the templet 41 may be out of contact with the master pattern, depending upon the character and shape desired for the block mold. Where the master pattern and templet are out of contact, the stop bolt 48 and the embossment 49 are in contact. The actuating arm 24 is both longitudinally and rotatably adjustable in the bosses 21 and 22 so that the travel of the main carriage may be adjusted relatively to the point where it is desired the pattern operating devices shall become effective. The cutting tool 19 is adjusted by the carriage feed and cross feeds until the desired position is obtained in the opening which was originally formed in the block mold. The power is then applied and the main shaft begins to turn. This drives the lead screw 4 and the lead screw clutch may now be operated to place the feed of the carriage under the control of the lead screw and thereby gradually feed the cutting tool into the block mold. As the feed progresses the tool cuts a circular path so long as the stops are in contact and as the templet 41 gradually begins to contact with the control 44 of the master pattern the stops are separated and the tool begins to develop the pattern in the mold. In view of the fact the master pattern is octagonal as illustrated in the present embodiment, the initial contact will be a series of succeeding impacts each of which slightly swings the actuating arm inwardly and thereby causes a slight rotation of the turret 12 which causes a corresponding movement of the cutting tool 19, which is supported by the turret. This action begins to form the tip of portion A of the flutes illustrated in Figure 4 of the block mold. As the movement continues the templet edge 42 being inclined to the direction of feed of the parts gradually contacts more and more with the control edge 44 of the master pattern until the contact is continuous, at which time the full flutes B (Fig. 4) are formed by the cutting tool in the mold and these flutes are divided by straight corners or lines C. Since the guiding edge 42 of the templet is practically a straight line beyond the curved portion, which straight line is inclined to the direction of movement of the main carriage, it follows that the tool 19 is gradually and constantly moved inwardly toward the axis of rotation of the shaft. This gradual and constant movement causes the path of the tool relative to the block mold to comprise a multi-sided conical path.

The feed is permitted to continue until the base of the mold is reached, at which time the feed may be automatically cut off or a workman may carefully watch the action of the tool and manually stop the feed. The mold is now complete in form and when polished and prepared for use is adapted for use in making tumblers such as are illustrated in Figure 5.

From the foregoing it will appear clear that the present device is a very positive and at the same time economical mechanism for producing fluted or configurated block molds, for use with glass machines, of the type heretofore manufactured by hand methods.

Having described my invention, I claim:

1. A device for manufacturing fluted molds for glass machines and the like comprising a main shaft, means for mounting a mold body on said main shaft, a pattern member also mounted on said main shaft, a turntable, a forming tool mounted on said turntable and adapted to operate upon said mold body, and an actuating device cooperating with said pattern to oscillate said turntable and said tool to produce a predetermined configuration on said mold.

2. A device for manufacturing fluted molds for glass machines and the like comprising a main shaft, means for mounting a mold body on one end of said main shaft, a pattern member also mounted on the other end of said main shaft, a forming tool adapted to operate upon said mold body, and an actuating device cooperating with said pattern to oscillate said tool to produce a predetermined configuration on said mold.

3. A device for manufacturing fluted molds for glass machines and the like comprising a main shaft, means for mounting a mold body on said main shaft, a plate pattern member also mounted on said main shaft, a turntable mounted adjacent one end of said main shaft, a forming tool mounted on said turntable and adapted to operate upon said mold body when said main shaft is rotated, and an actuating device cooperating with said plate pattern to oscillate said turntable and said tool to produce a predetermined configuration on said mold.

4. A device for manufacturing fluted molds for glass machines and the like comprising a main shaft, means for mounting a mold body on said main shaft, a pattern member also mounted on said main shaft, a forming tool adapted to operate upon said mold body, a rotatable turntable on which said tool is mounted, and an actuating device cooperating with said pattern to oscillate said turntable and said tool to produce a predetermined configuration on said mold.

5. A device of the character described comprising in combination a main shaft, means for mounting a mold body on one end of said main shaft, a pattern mounted on the other end of said main shaft, a tool mounted to oscillate relatively to said mold body, and a control member operatively connected with said pattern and said tool whereby a predetermined configuration is adapted to be given to said mold.

6. A device of the character described comprising in combination, a main shaft, means for mounting a mold body on one end of said main shaft, a hollow pattern mounted on the other end of said main shaft, a tool mounted for movement relatively to said mold body, and a control member operatively connected with said pattern and said tool whereby a predetermined configuration is adapted to be given to said mold.

7. A device of the character described comprising in combination a main shaft, means for mounting a mold body on one end of said main shaft, a pattern mounted on the other end of said main shaft, a tool mounted to oscillate relatively to said mold body, a control member operatively connected with said pattern and said tool whereby a predetermined configuration is adapted to be given to said mold, and a templet on said member.

8. A device of the character described comprising in combination a main shaft, means for mounting a mold body on one end of said main shaft, a pattern adapted to control cross-sectional shape and mounted on the other end of said main shaft, a tool mounted to oscillate relatively to said mold body, a control member operatively connected with said pattern and said tool, and a templet on said member, said templet controlling longitudinal shape.

9. A device of the character described comprising a main shaft, work supporting means on one end of said main shaft, a pattern member on the other end of said main shaft, a forming tool adapted for rotation relatively to said main shaft, means to feed said tool longitudinally of the work, an actuating device operatively connected with said pattern and being adapted to oscillate said tool to cause same to follow a predetermined path, and stop means adapted to determine when said oscillation shall begin relatively to the feed of the tool.

10. A device of the character described comprising a main shaft, work supporting means on one end of said main shaft, a pattern member on the other end of said main shaft, a forming tool adapted for rotation relatively to said main shaft, means to feed said tool longitudinally of the work, an actuating device carrying the templet and being adapted to oscillate said tool to cause same to follow a predetermined path, a templet adapted to engage said pattern, and stop means adapted to determine when said oscillation shall begin relatively to the feed of the tool.

11. A device of the character described comprising a main shaft, work supporting means on one end of said main shaft, a pattern member on the other end of said main shaft, a forming tool adapted for rotation relatively to said main shaft, means to feed said tool longitudinally of the work, an actuating device operatively connected with said pattern and being adapted to oscillate said tool to cause same to follow a predetermined path, means tending to cause said templet and pattern to be engaged, and stop means adapted to determine when said oscillation shall begin relatively to the feed of the tool.

12. In a device of the character described, a work support, a tool mounted for movement relatively to said work support, a pattern adapted to operate said tool, and a templet cooperating with said pattern to modify the effect of said pattern in determining the path of said tool.

13. In a device of the character described, a work support, a tool mounted for movement relatively to said work support, a pattern adapted to operate said tool and to control the transverse path of the tool, and a templet cooperating with said pattern to modify the effect of said pattern on the path of said tool work support, and to control the longitudinal path of the tool.

14. In a device for automatically shaping articles, the combination of a shaping tool, means to feed the shaping tool relatively to the work, and pattern control devices for determining the path of said tool, said pattern control devices comprising a relatively thin templet plate having movement in one direction and a relatively thin pattern plate having a movement at substantially right angles to the templet plate whereby one of said plates tends to control cross-sectional shape of the article being formed and the other of said plates tends to control the longitudinal sectional shape of the device being formed.

15. In a device for automatically shaping articles, the combination of a shaping tool, means to feed the shaping tool relatively to the work, and pattern control devices for determining the path of said tool and operatively connected with the tool, said pattern control devices comprising a relatively thin templet plate having movement in one direction and a relatively thin pattern plate having a movement at substantially right angles to the templet plate whereby one of said plates tends to control cross-sectional shape of the article being formed and the other of said plates tends to control the longitudinal sectional shape of the device being formed and means for simultaneously rotating certain of said plates and said article.

16. A device for shaping articles comprising a shaping tool, means for feeding said shaping tool relatively to the work, pattern control devices comprising a plurality of plates, the shape of certain of said plates controlling transverse sectional shape of the device being made and the shape of other of said plates controlling longitudinal sectional shape.

17. A device for shaping articles comprising a shaping tool, means for feeding said shaping tool relatively to the work pattern control devices for controlling the path of the tool comprising a plurality of plates, certain of said plates controlling transverse sectional shape of the device being made and the shape of other of said plates controlling longitudinal sectional shape.

18. In a device of the character described, a work support, a tool mounted for movement relatively to said work support, a pattern adapted to operate said tool and means engaging said pattern to modify the effect of said pattern in determining the path of said tool.

19. In a device of the character described, a work support, a tool mounted for movement relatively to said work support, a pattern adapted to operate said tool, and to control the transverse path of the tool, and means engaging said pattern to modify the effect of said pattern on the path of said tool and to control the longitudinal path of said tool.

20. In a device of the character described, in combination, a work support, a turntable adjacent said work support, a tool mounted on said turntable, a pattern adapted to oscillate said turntable to control the transverse path of said tool, and means engaging said pattern and operatively connected to said turntable to control the longitudinal path of said tool.

PETER KUCERA.